United States Patent [19]

Caso

[11] 4,336,666
[45] Jun. 29, 1982

[54] PLANT WATERERS

[76] Inventor: Adolph Caso, 158 Hickory Rd., Weston, Mass. 02193

[21] Appl. No.: 119,300

[22] Filed: Feb. 7, 1980

[51] Int. Cl.³ .............................................. A01G 29/00
[52] U.S. Cl. ......................................... 47/48.5; 47/25
[58] Field of Search ........................ 47/25, 32, 79, 48.5

[56] References Cited

U.S. PATENT DOCUMENTS

| 1,029,107 | 6/1912 | Couls | 47/48.5 X |
| 3,005,287 | 10/1961 | Dudley | 47/25 |
| 3,896,586 | 7/1975 | Caldwell | 47/79 X |
| 4,087,938 | 5/1978 | Koch | 47/48.5 |

FOREIGN PATENT DOCUMENTS

| 601788 | 7/1960 | Canada | 47/48.5 |
| 322809 | 7/1920 | Fed. Rep. of Germany | 47/79 |
| 42398 | 4/1917 | Sweden . | |
| 1292803 | 10/1972 | United Kingdom | 47/48.5 |

Primary Examiner—Robert E. Bagwill
Attorney, Agent, or Firm—Maurice R. Boiteau

[57] ABSTRACT

There is disclosed in the present application a plant waterer which is torroidal in shape and formed with a slit to permit it to be placed around the base of the plant. The torroid is a reservoir for water and/or plant nutrient and is formed with a covered aperture through which the contents may be replenished without removing it from its operative position around the plant. The reservoir is in communication with tubular metering nozzles which are customized in their output rate to suit the requirements of the plant.

1 Claim, 3 Drawing Figures

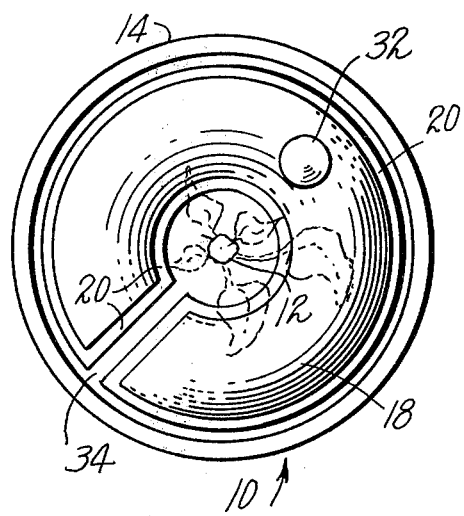
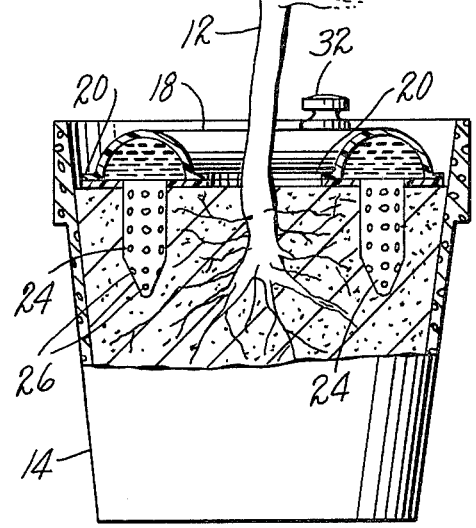
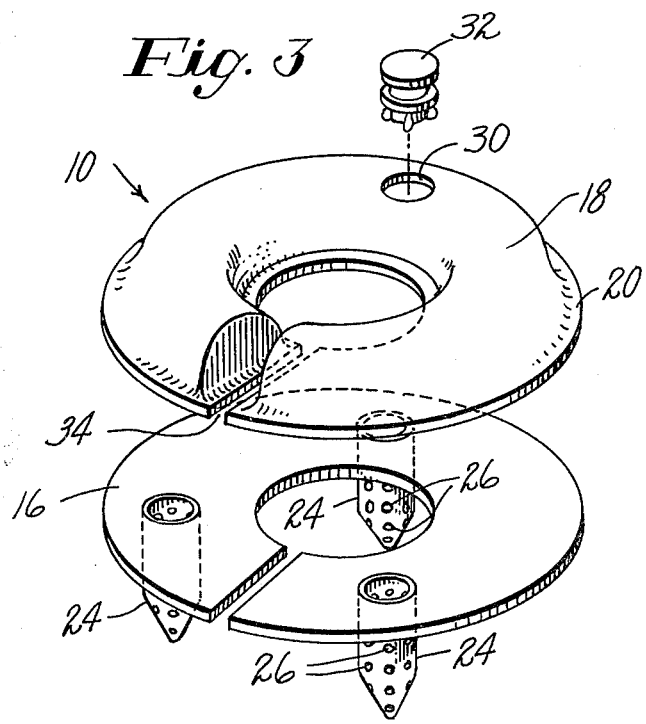

PLANT WATERERS

The present application relates generally to improvements in torroidal plant waterers and feeders and more particularly to such waterers which are adapted to being adjusted in their output to suit the requirements of the specific plant with which each is associated.

In order for a plant to thrive whether it is outdoors or a potted house plant, it must receive an appropriate quantity of moisture and food. But the quantity of water and food required varies greatly from one species to another. In addition, it is necessary for best results that the water and food be supplied at uniformly regular intervals and that the food be in diluted form so as to avoid damaging the plant. However, it is very difficult under any circumstances to provide both the required moisture and nutrient on a regularly controlled basis and especially so when the owner must be away from the plants for extended periods.

During extended periods of the owner's absence or inattention to the needs of the plants, particularly those which are outdoors tend to become engulfed with weeds which must be controlled if the plants are to survive and thrive. Thus, a watering and nutrient feeding device is more acceptable to a prospective user if in addition to its fluid metering function, it also discourages the growth of weeds around the base of the plant and conserves moisture by acting essentially as a mulch. But because any device for watering and feeding plants on an individual basis may require a large number of units, it is necessary, in order to be broadly acceptable, that the device be both inexpensive to produce and easy to use.

It is accordingly an object of the present invention to provide a watering device for plants which is readily installed and which may be adjusted at the time of installation to furnish the optimum amount of water and/or nutrient to the plant.

Another object is to reduce the cost of manufacturing plant waterers at the same time that their flexibility is being improved.

In the achievement of the foregoing objects, a feature of the invention relates to a torroidally shaped hollow body which serves as a reservoir of water to meet the needs of a particular plant to which it is applied. The torroid is slit radially and is of a flexible material so that it may be deformed to fit the reservoir directly around the base of the plant. According to a related feature, the present waterer is fitted with one or more metering nozzles which, as the waterer is being installed around the base of the plant, are pressed into the soil beneath the surface. Prior to installing the waterer around the plant, the metering nozzles which are provided to the user in imperforate condition, are punctured by the user using a sharp instrument such as a pin or an awl. The number and size of punctures determines the output or flow rate from the waterer to the plant and thus provides a means of customizing the waterer to the individual needs of the plant with which it is associated.

The foregoing objects and features of the present invention will be more fully understood from the following detailed description of an illustrative embodiment thereof taken in connection with the accompanying drawings in which:

FIG. 1 is a plan view of a plant waterer according to the present invention;

FIG. 2 is a view in front elevation and partly in cross-section of the waterer of FIG. 1, shown in connection with a potted plant; and FIG. 3 is a detail view in perspective showing the manner in which the waterer of FIGS. 1 and 2 is constructed.

Turning now to the drawings, there is shown a plant waterer indicated generally at 10, applied to a plant 12 growing in a pot 14. The waterer 10, as seen in FIG. 3, may be constructed of two plastic parts, a base 16 and a bell 18 which are fused together along a line 20 at the margins of the parts. The base 16 is formed with three integral metering nozzles 24 which are imperforate at the time that the waterer is supplied to the purchaser who simply punctures the nozzles as shown at 26 with an awl or other sharp instrument, the number and size of the punctures being determined in accordance with the requirements of the plant for water and/or nutrient. It will also be noted that the distal ends of the nozzles 24 are pointed so that they may be more easily pressed into the soil. The bell 18 is formed with a filler opening 30 which is closed by a plug 32.

The fusing together of the base 16 and the bell 18 is accomplished by means of conventional production machines which are readily available. The separate parts are produced by well known processes such as vacuum forming, injection and blow molding. Both the production of the component parts and their fusion together to form the body of the waterer, are accomplished by highly efficient processes, which further reduces the cost of manufacture.

When the base 16 and the bell 18 are joined together, they form a reservoir 28, as seen in FIG. 2, for water or nutrient. For convenience in placing the waterer in working relationship around the base of a plant, it is formed with a radial slot 34. The waterer 10 is thus applied to a plant by deforming it slightly so that it can be placed around the trunk of the plant and the nozzles pressed into the soil.

From the foregoing description of an illustrative embodiment of my invention and from the accompanying drawings, numerous modifications will become readily apparent to those of ordinary skill in the art. For example, it may be suggested by a reader that the devices of the present invention, rather than being manufactured as individual units, may be produced as a set joined together at their margins and with a plurality of openings for plants arranged in a fixed spatial relationship. It is therefore not intended that this specification be taken in a limiting sense but rather that the scope of the invention be interpreted from the appended claims.

Having thus disclosed my invention, what I claim as new and desire to secure by Letters Patent of the United States is:

1. A plant waterer, comprising a flexible and hollow reservoir adapted to lie upon the soil in which a plant is potted and including upper and lower C-shaped flexible co-extensive plastic sheets each having a single continuous edge sealed along its entire length to the edge of the other sheet, the bottom sheet being essentially flat and the upper sheet being dome shaped in a vertical plane and formed with an inlet opening for fluids, the waterer further comprising a plurality of metering nozzles formed in imperforate condition, integral with the bottom sheet and adapted to be perforated at the time of being placed in service to adapt the quantity of fluid furnished to the plant extending upwardly through the central portion of the reservoir.

* * * * *